Figure 1:
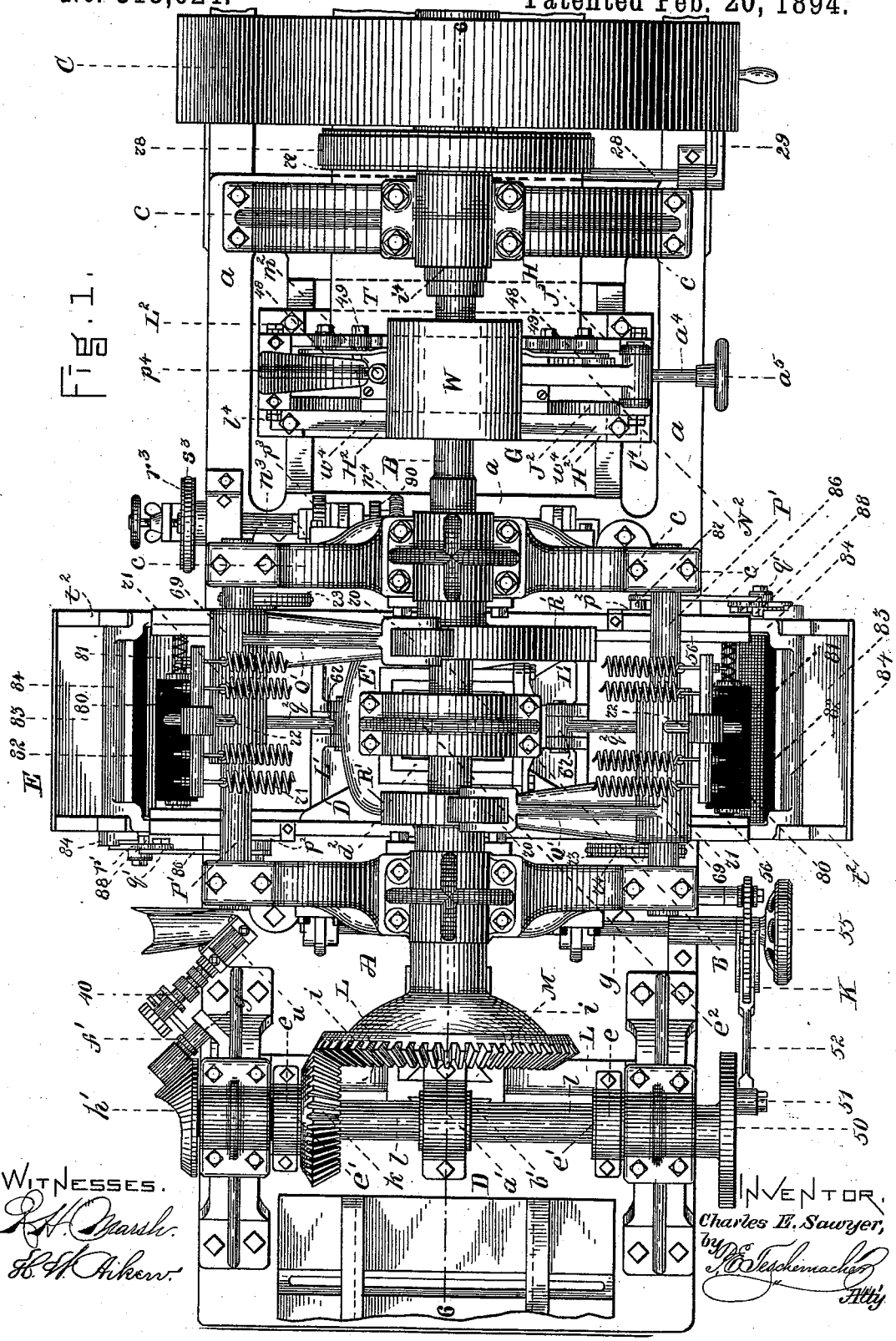

(No Model.) 16 Sheets—Sheet 1.

C. E. SAWYER.
MACHINE FOR MAKING TAGS AND COUNTING AND SEPARATING SAME INTO PILES.

No. 515,024. Patented Feb. 20, 1894.

Witnesses.
R. H. Marsh.
H. W. Akers.

Inventor.
Charles E. Sawyer,
by Teschemacher
Atty (No Model.) 16 Sheets—Sheet 2.
C. E. SAWYER.
MACHINE FOR MAKING TAGS AND COUNTING AND SEPARATING SAME INTO PILES.
No. 515,024. Patented Feb. 20, 1894.
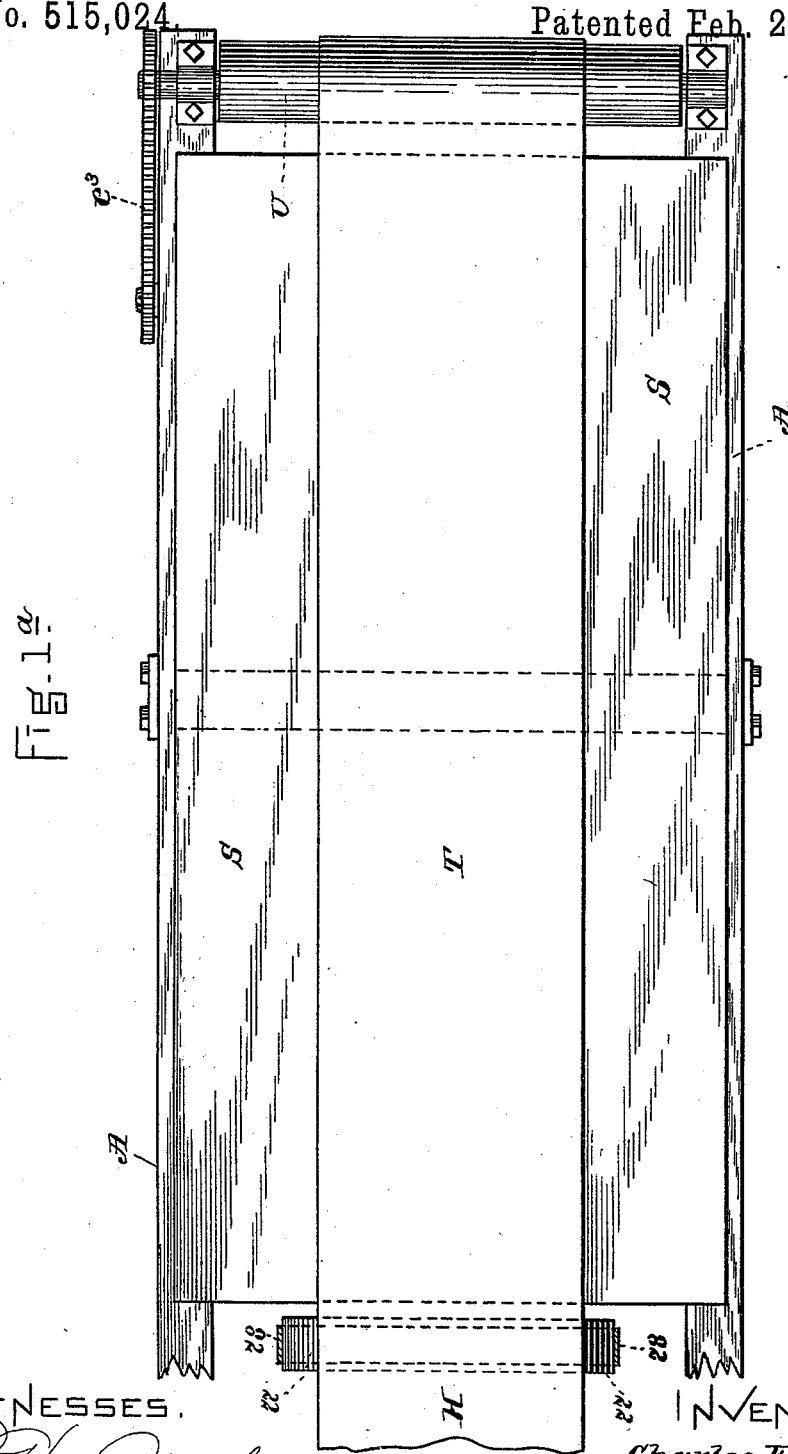
Fig. 1ᵃ
Witnesses.
Inventor.
Charles E. Sawyer,

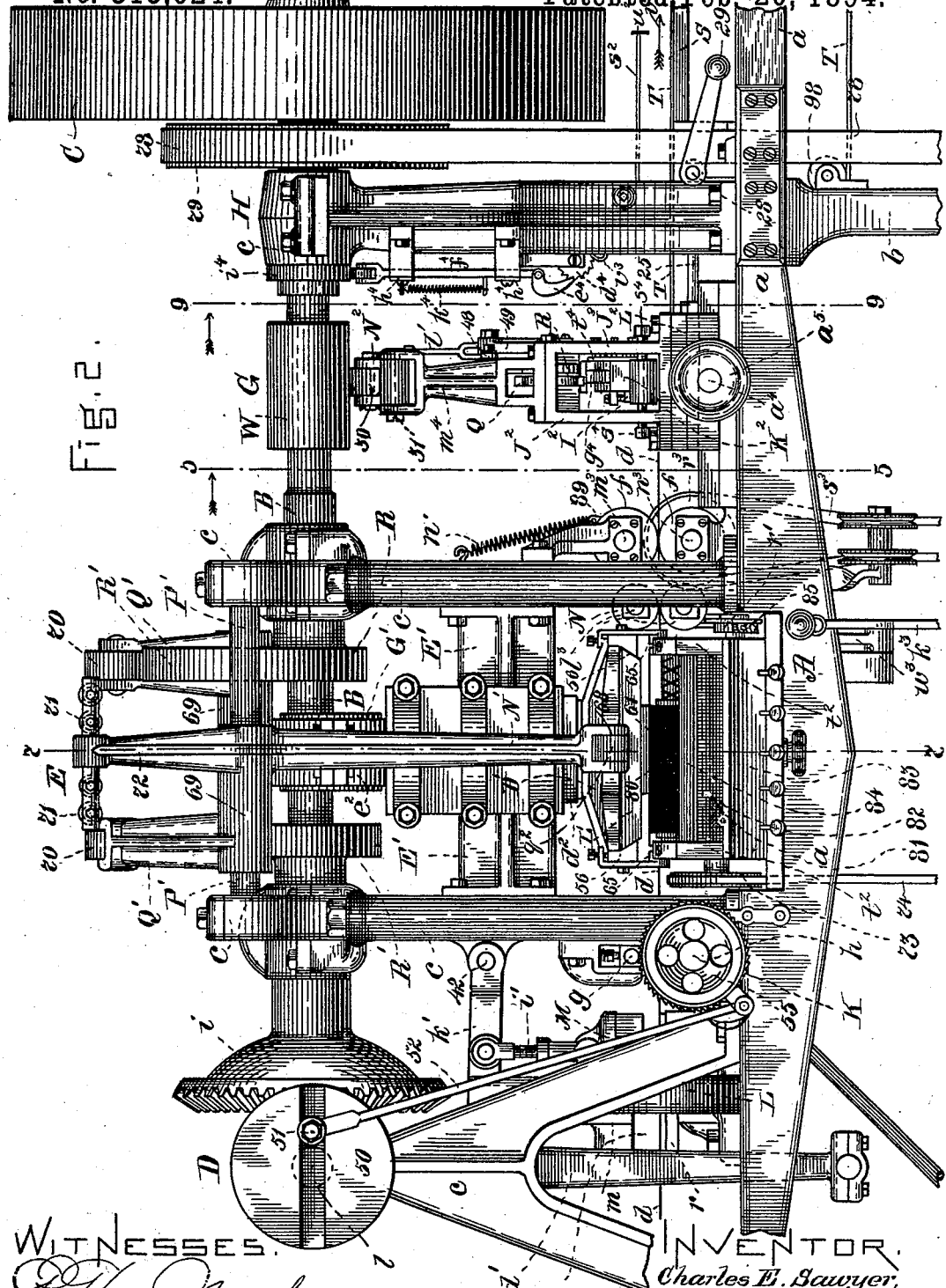

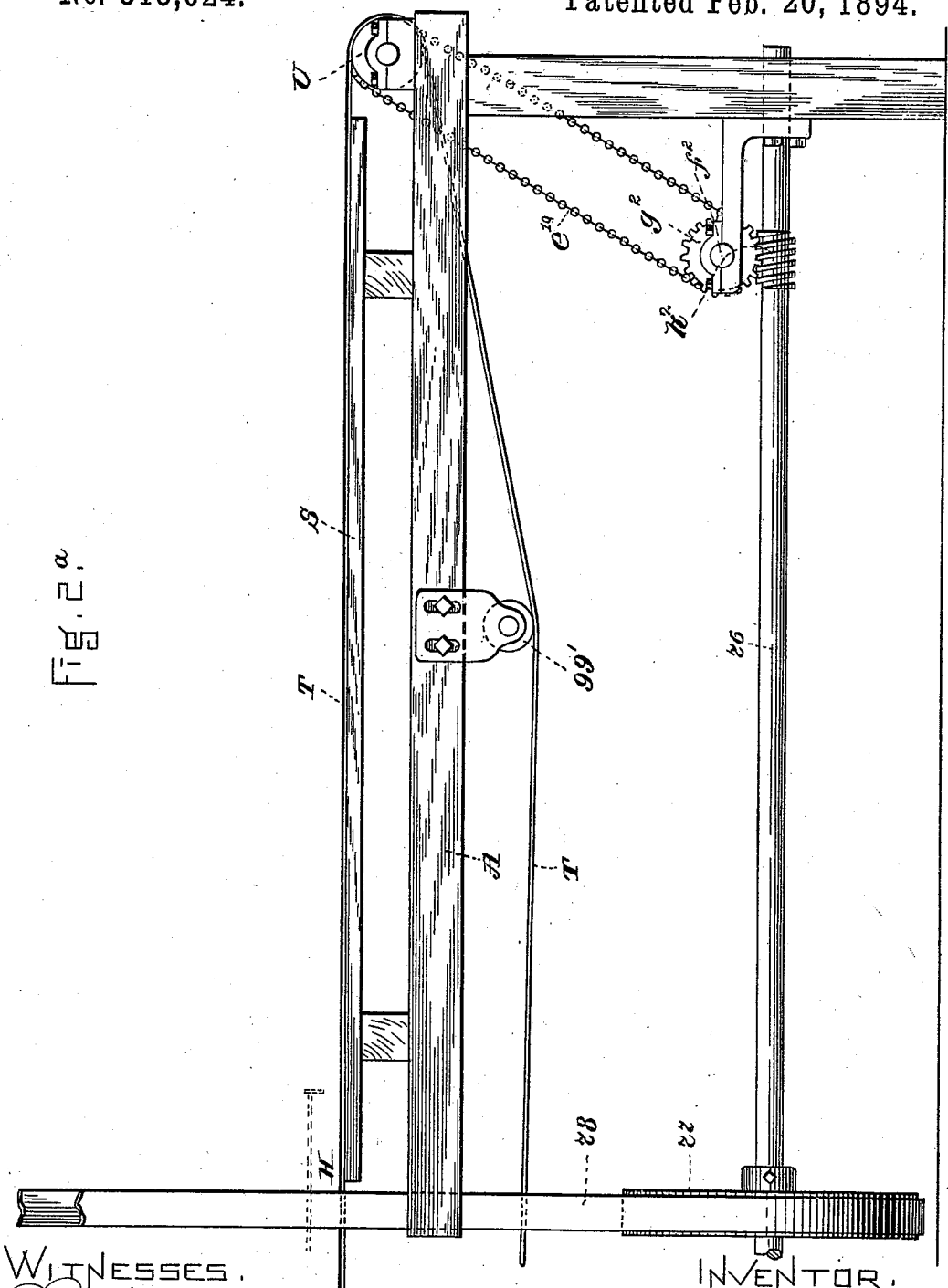

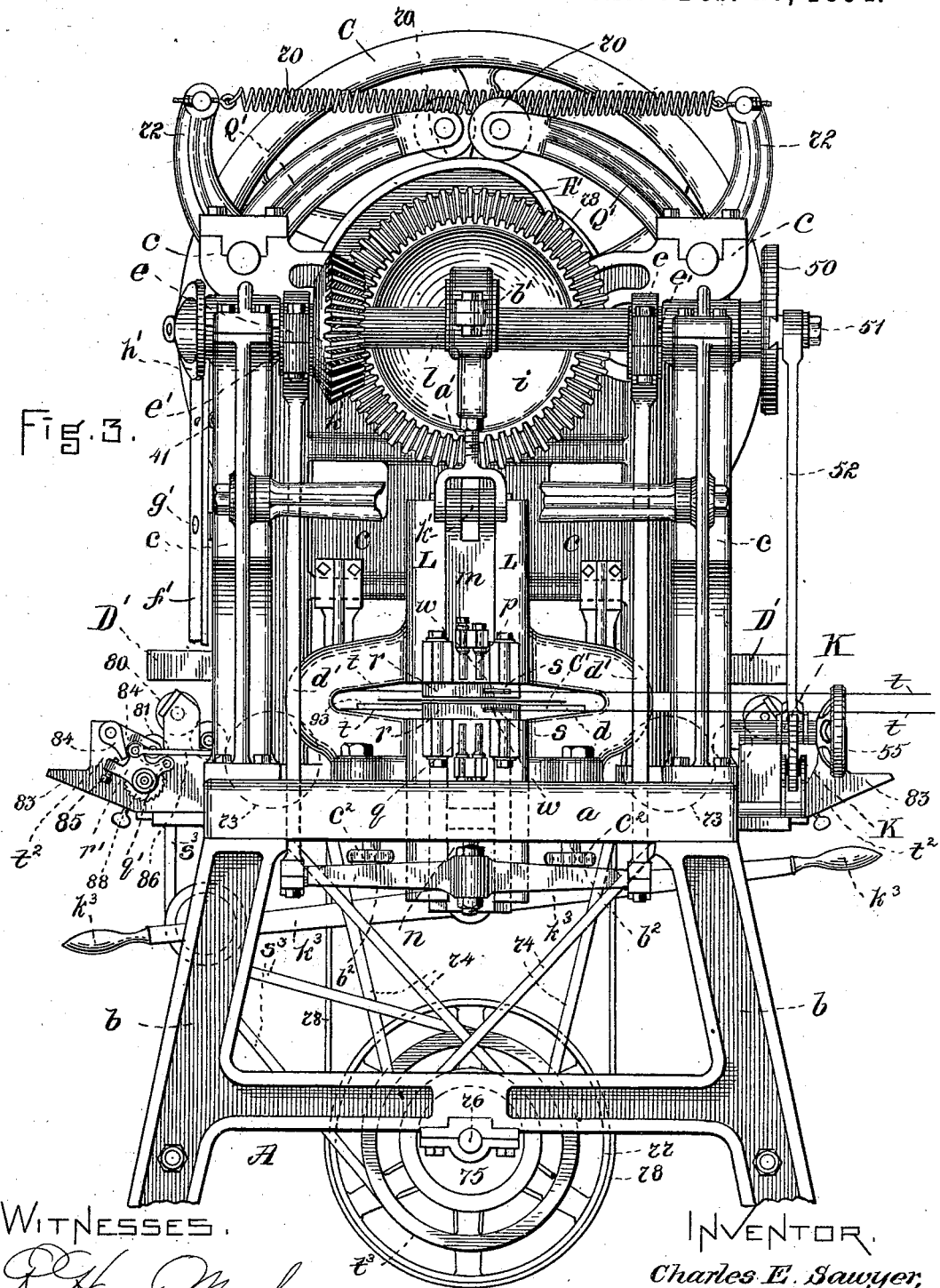

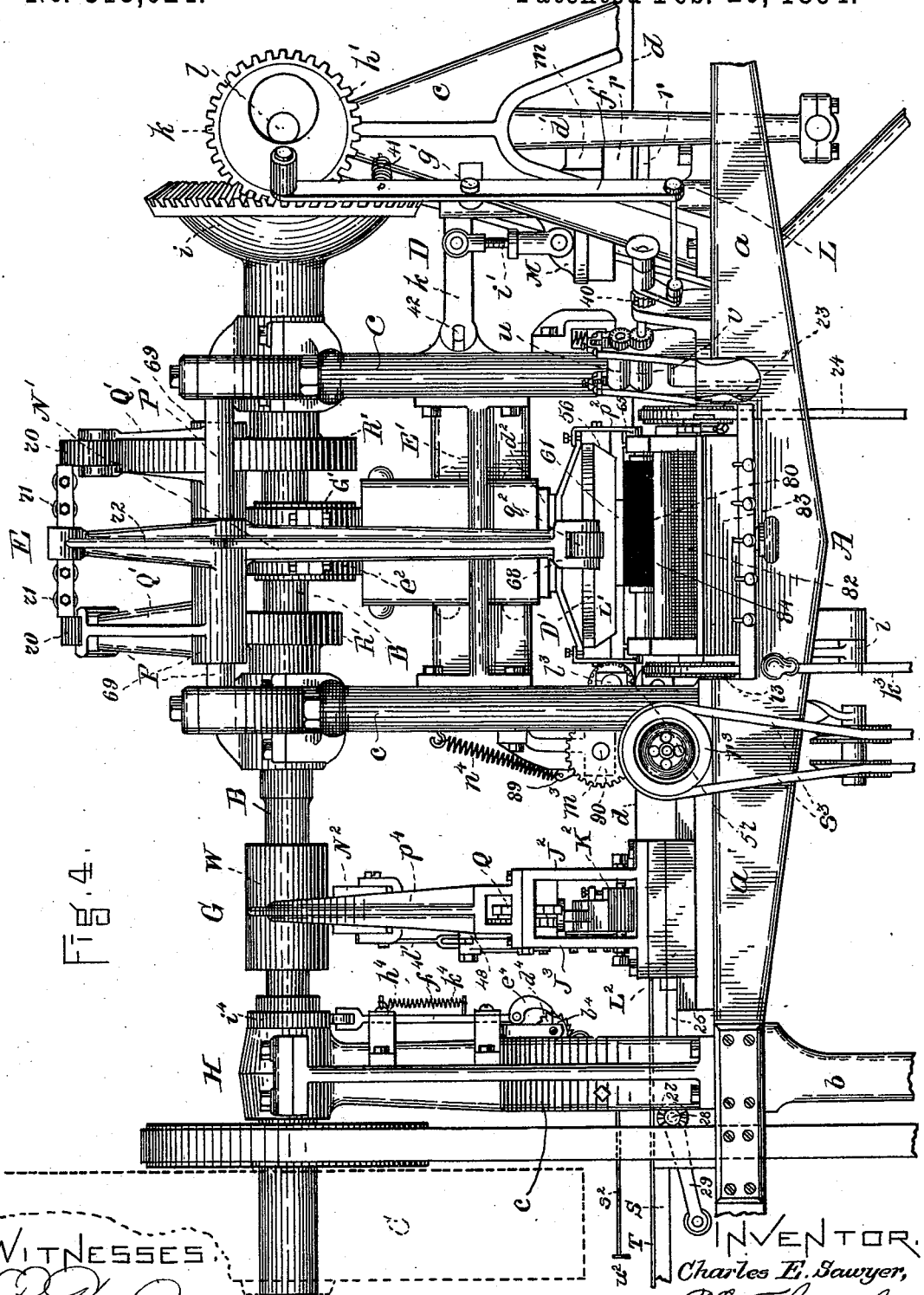

(No Model.) 16 Sheets—Sheet 7.

C. E. SAWYER.
MACHINE FOR MAKING TAGS AND COUNTING AND SEPARATING SAME INTO PILES.

No. 515,024. Patented Feb. 20, 1894.

Witnesses
Henry Marsh
Harry W. Aiken

Inventor
Charles E. Sawyer,
by his Atty.

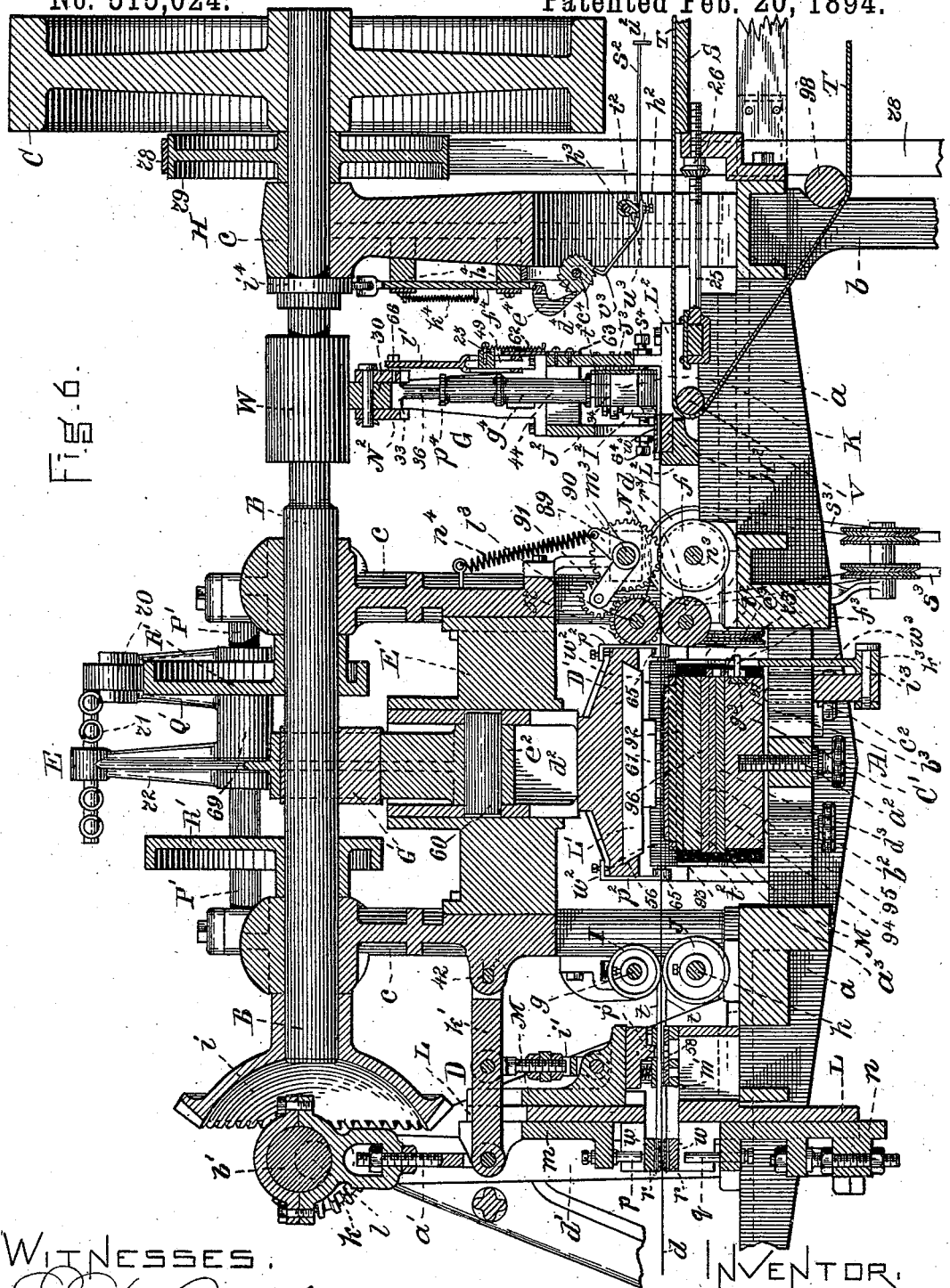

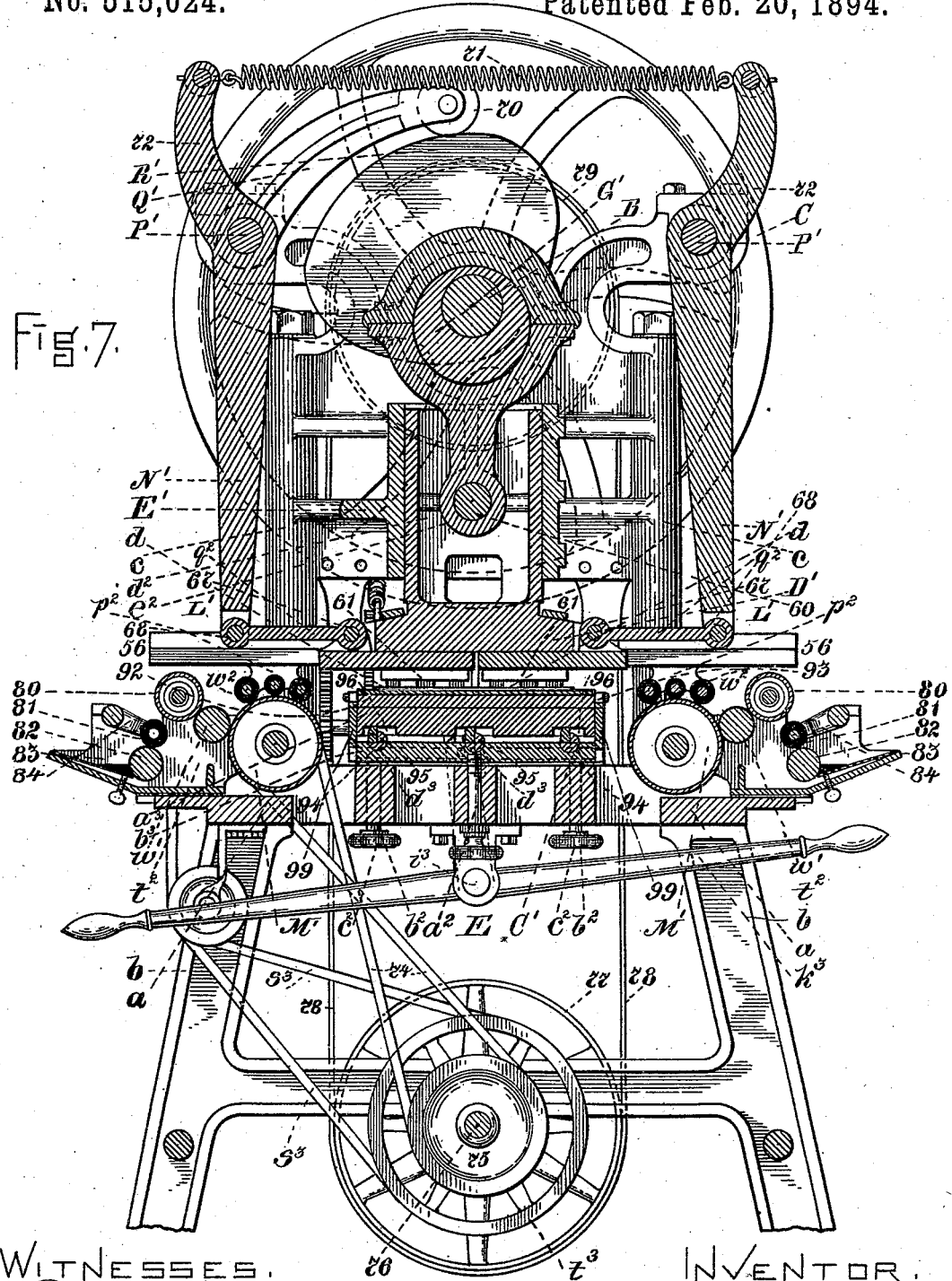

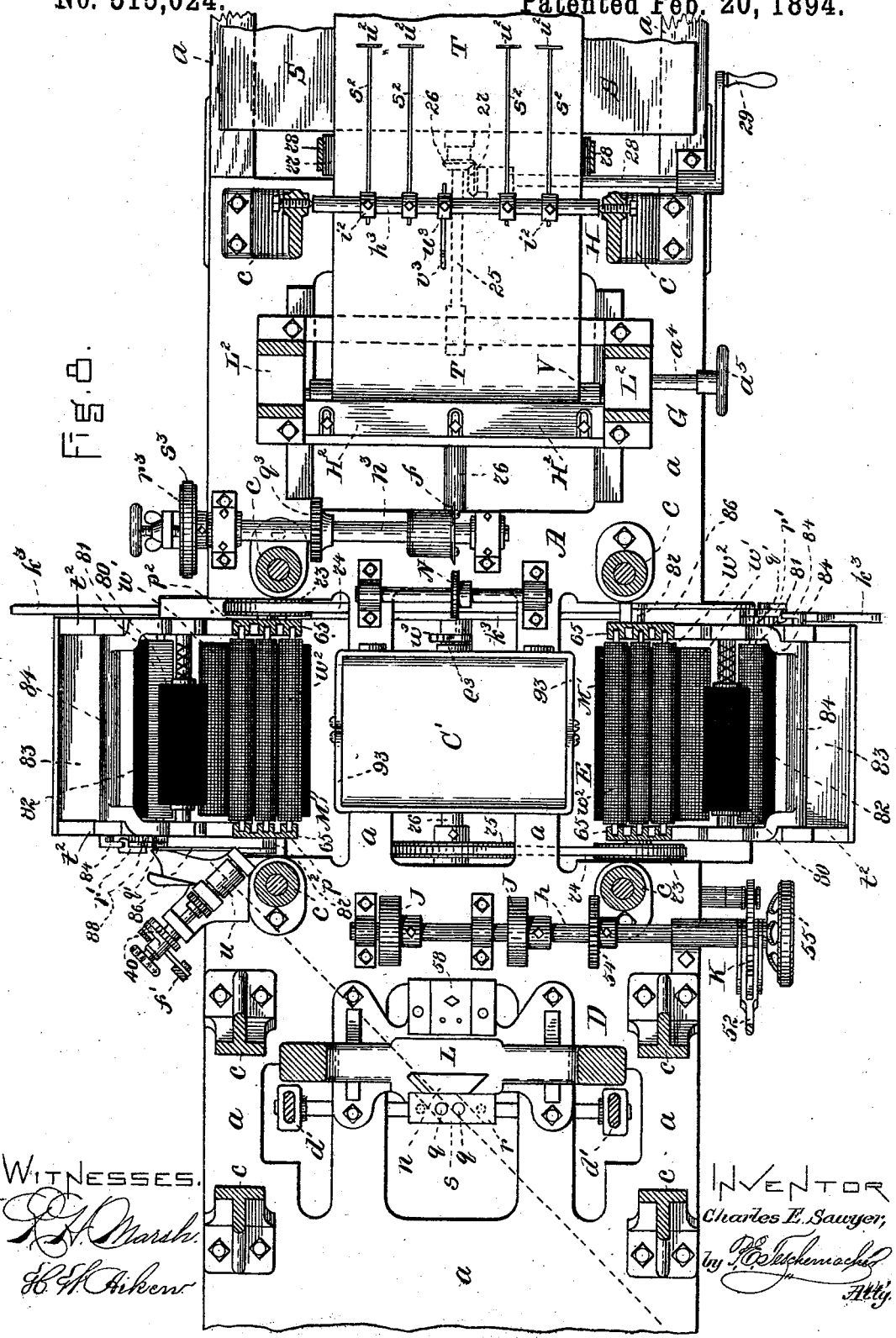

(No Model.) 16 Sheets—Sheet 11.
C. E. SAWYER.
MACHINE FOR MAKING TAGS AND COUNTING AND SEPARATING SAME INTO PILES.

No. 515,024. Patented Feb. 20, 1894.

WITNESSES.
R. Henry Marsh.
Harry W. Aiken.

INVENTOR.
Charles E. Sawyer,
by P. E. Teschemacher
Atty.

(No Model.)  16 Sheets—Sheet 12.
C. E. SAWYER.
MACHINE FOR MAKING TAGS AND COUNTING AND SEPARATING SAME INTO PILES.
No. 515,024. Patented Feb. 20, 1894.
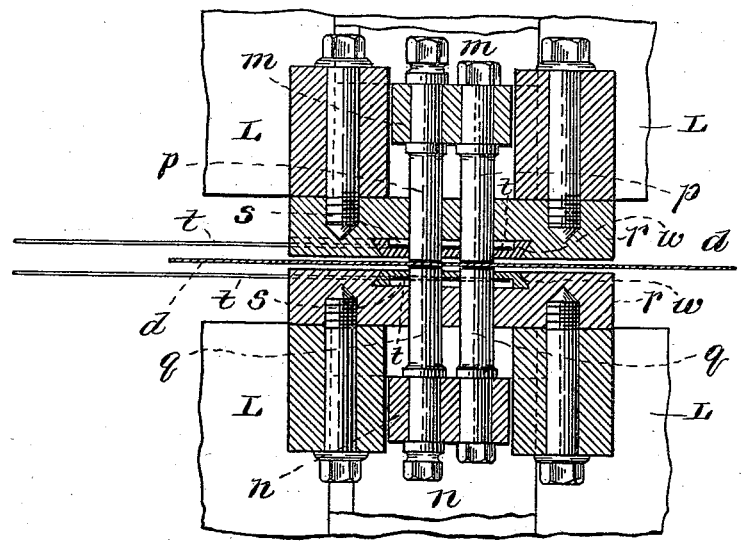
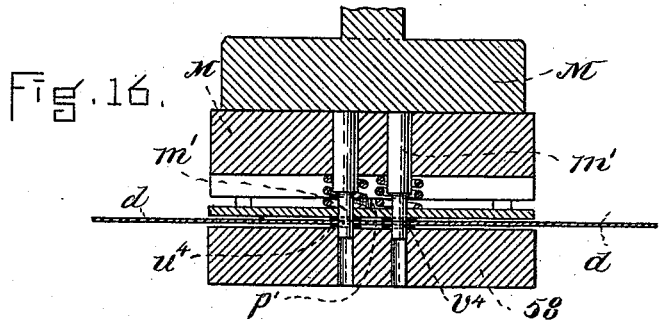
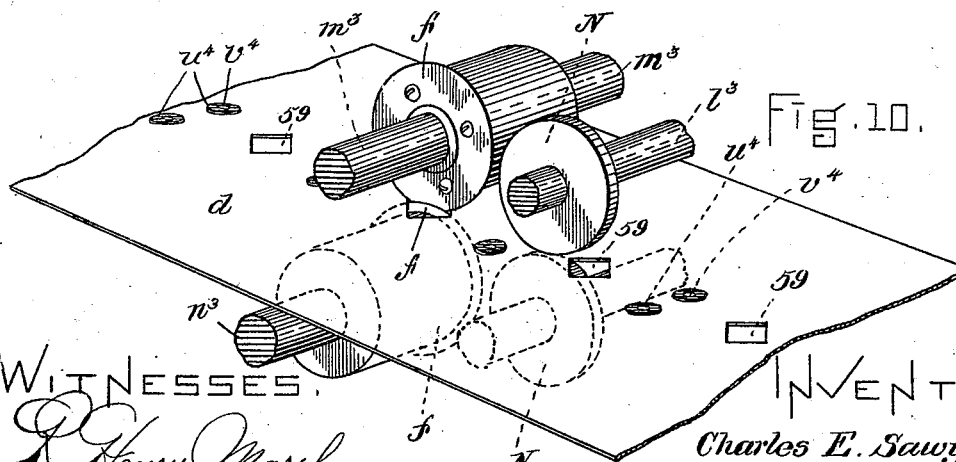
WITNESSES.
Henry Marsh.
Harry W. Aiken.
INVENTOR.
Charles E. Sawyer,
by T. C. Teschemacher
Atty.

(No Model.) 16 Sheets—Sheet 13.
C. E. SAWYER.
MACHINE FOR MAKING TAGS AND COUNTING AND SEPARATING SAME INTO PILES.
No. 515,024. Patented Feb. 20, 1894.
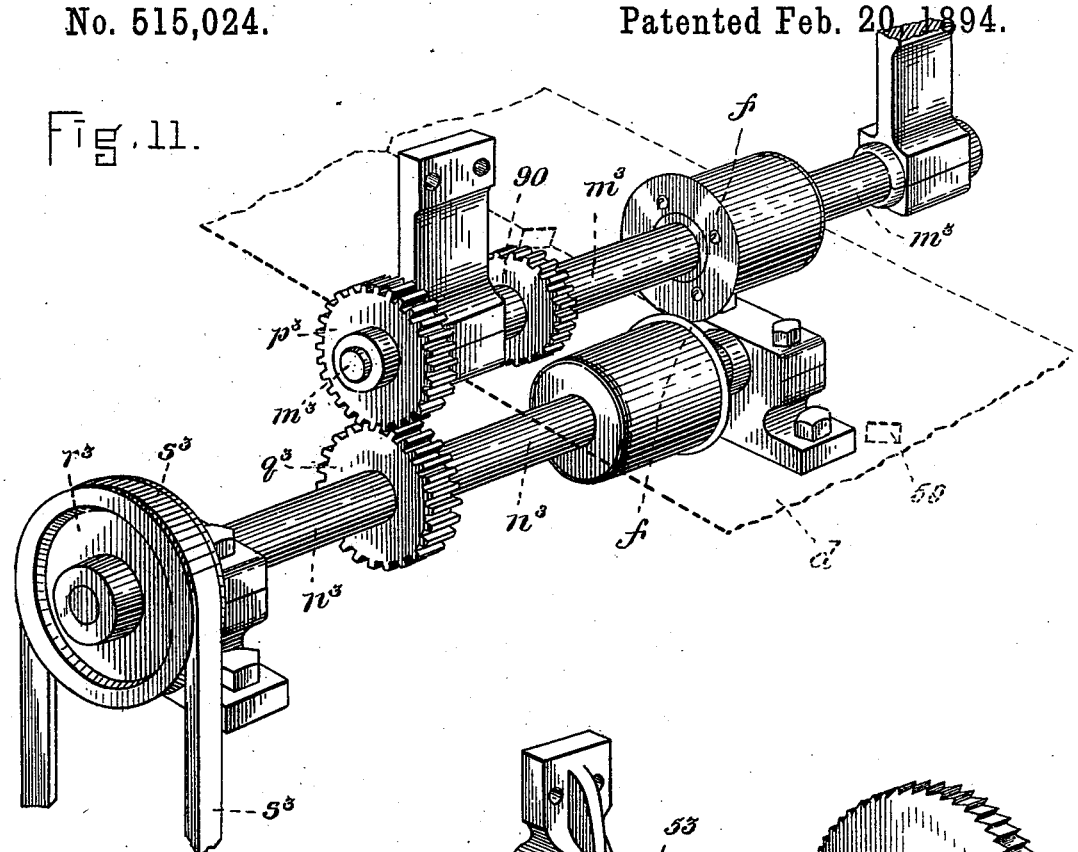
Fig. 11.
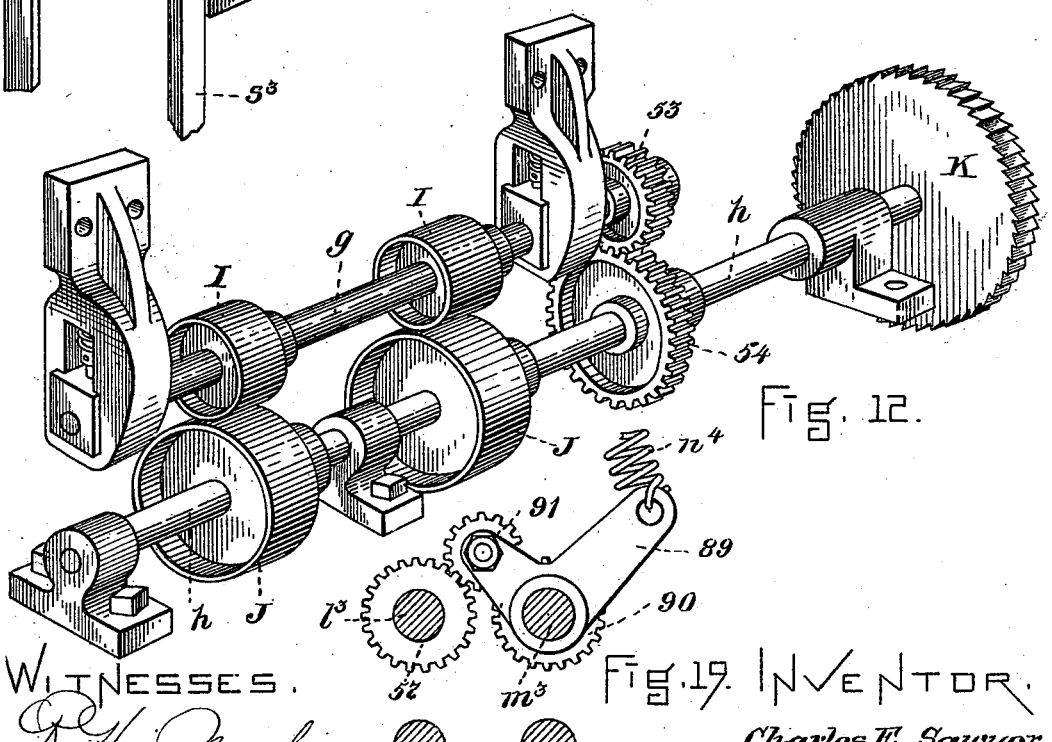
Fig. 12.
Fig. 17.
WITNESSES.
Henry Marsh.
Harry W. Aiken.
INVENTOR.
Charles E. Sawyer,
by his Atty.

(No Model.) 16 Sheets—Sheet 14.

C. E. SAWYER.
MACHINE FOR MAKING TAGS AND COUNTING AND SEPARATING SAME INTO PILES.

No. 515,024. Patented Feb. 20, 1894.

Witnesses.
Henry Marsh.
Harry H. Aiken.

Inventor.
Charles E. Sawyer.
by Teschemacher
Atty.

(No Model.)  16 Sheets—Sheet 15.
C. E. SAWYER.
MACHINE FOR MAKING TAGS AND COUNTING AND SEPARATING SAME INTO PILES.
No. 515,024.  Patented Feb. 20, 1894.
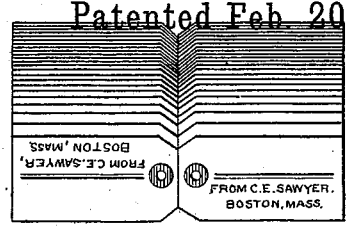
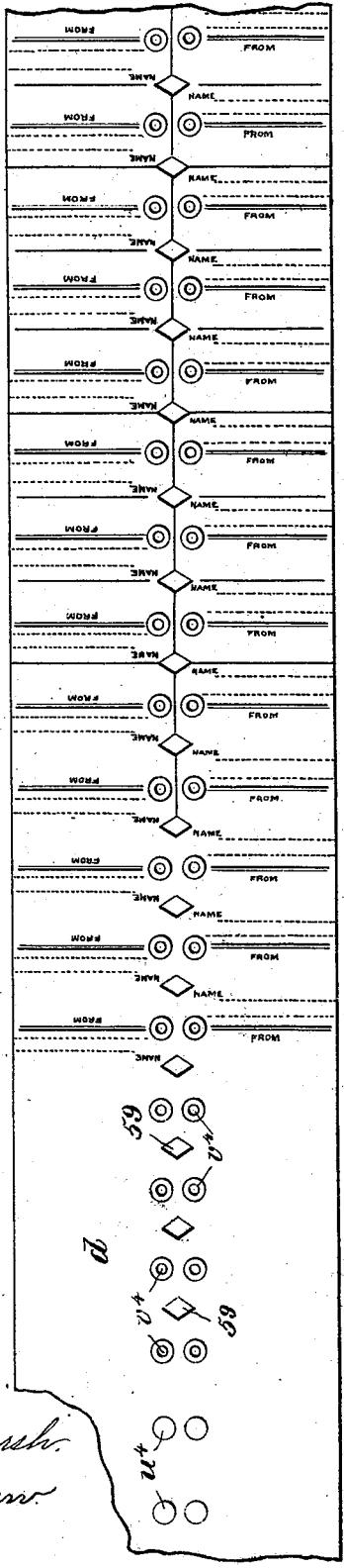
Fig. 16.
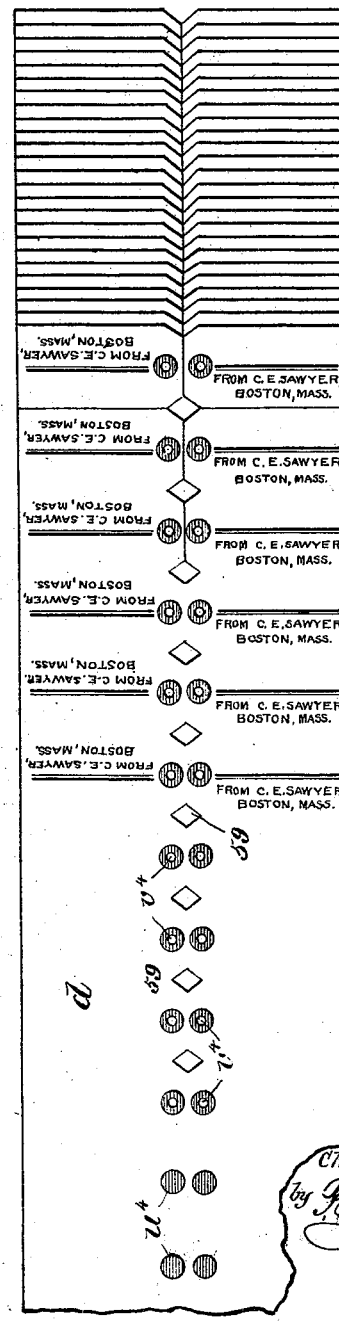
Fig. 17.
Witnesses.
Inventor,
Charles E. Sawyer, (No Model.)    16 Sheets—Sheet 16.

C. E. SAWYER.
MACHINE FOR MAKING TAGS AND COUNTING AND SEPARATING SAME INTO PILES.

No. 515,024.    Patented Feb. 20, 1894.

WITNESSES.
Henry Marsh.
Harry H. Aiken.

INVENTOR.
Charles E. Sawyer,
by F. E. Teschemacher
Atty.

UNITED STATES PATENT OFFICE.

CHARLES E. SAWYER, OF BOSTON, MASSACHUSETTS.

MACHINE FOR MAKING TAGS AND COUNTING AND SEPARATING SAME INTO PILES.

SPECIFICATION forming part of Letters Patent No. 515,024, dated February 20, 1894.

Application filed August 5, 1893. Serial No. 482,472. (No model.)

*To all whom it may concern:*

Be it known that I, CHARLES E. SAWYER, a citizen of the United States, residing at Boston, in the county of Suffolk and State of Massachusetts, have invented certain Improvements in Machines for Making Tags and Counting and Separating the Same into Piles or Parcels, of which the following is a full, clear, and exact description, reference being had to the accompanying drawings, making part of this specification, in which—

Figure 5:
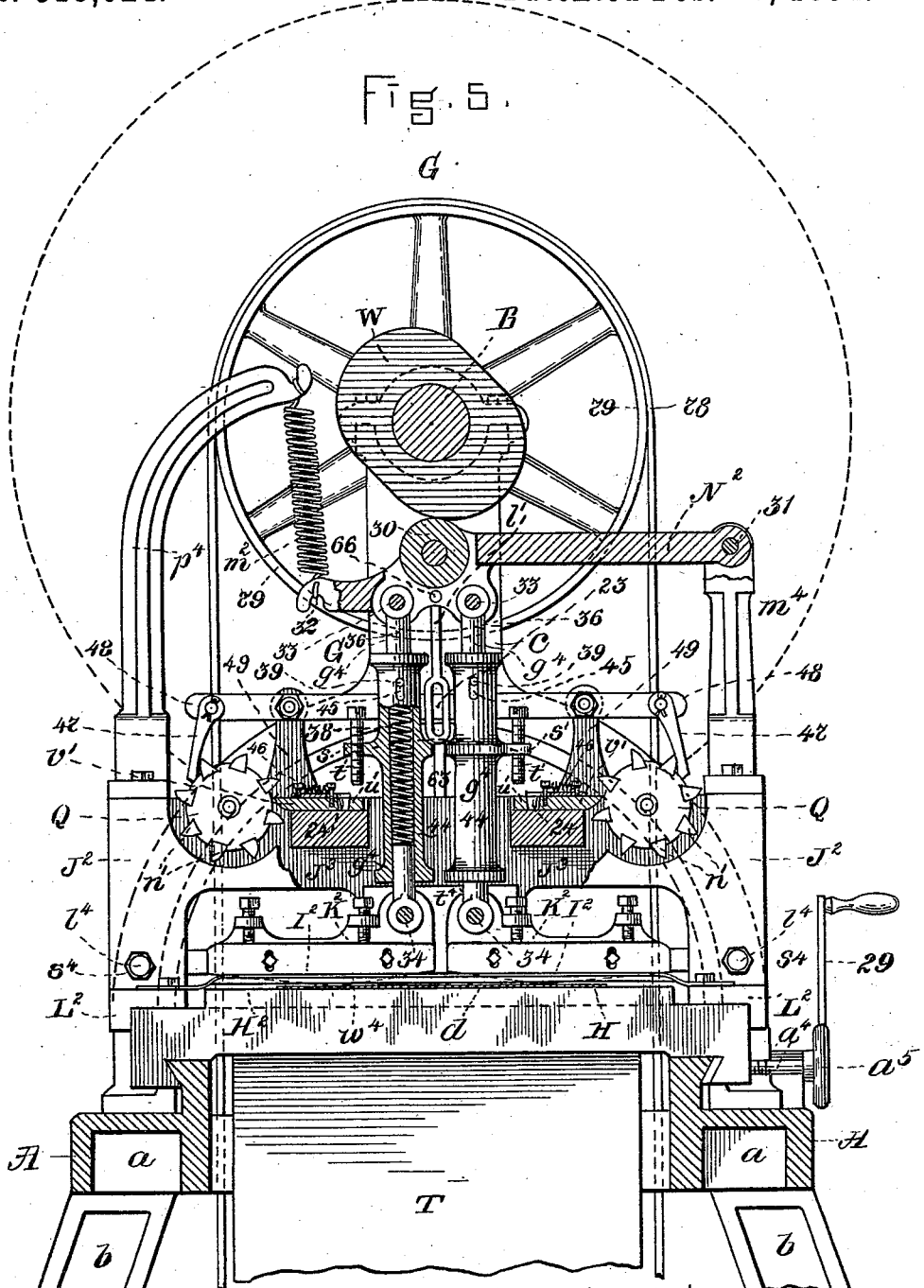
Figure 7:
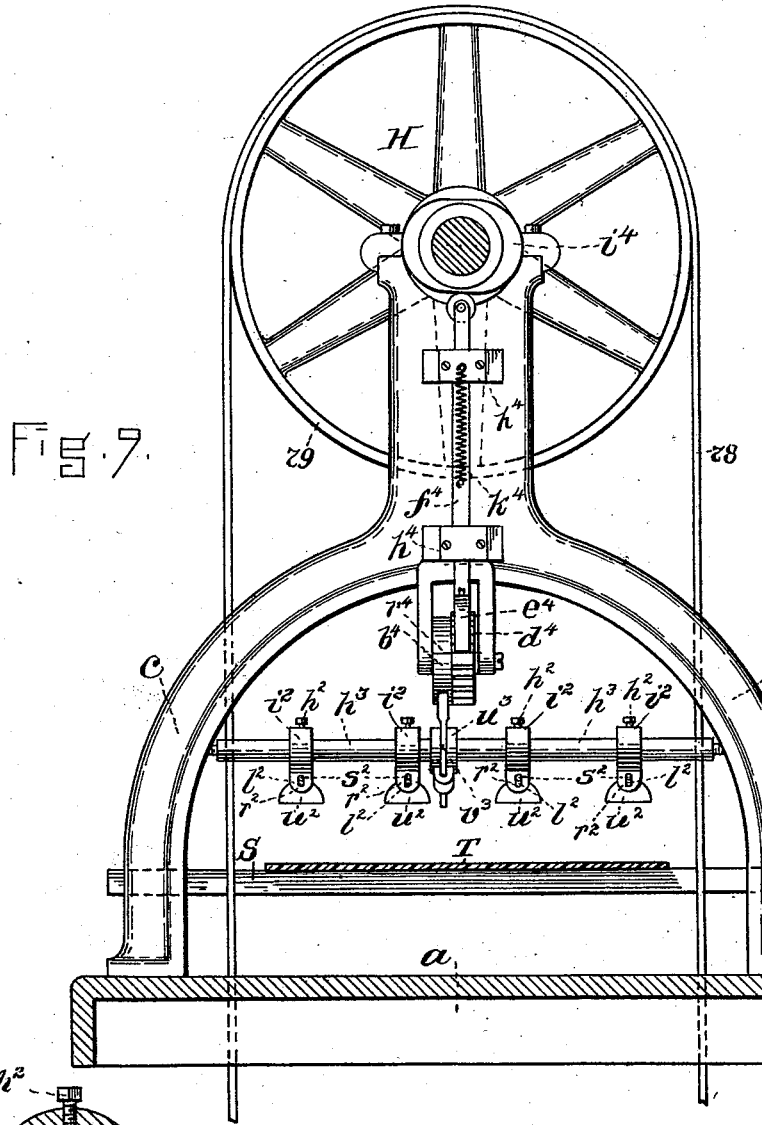
Figure 20:
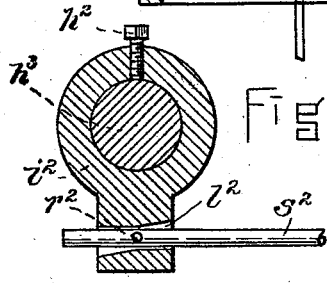
Figure 13:
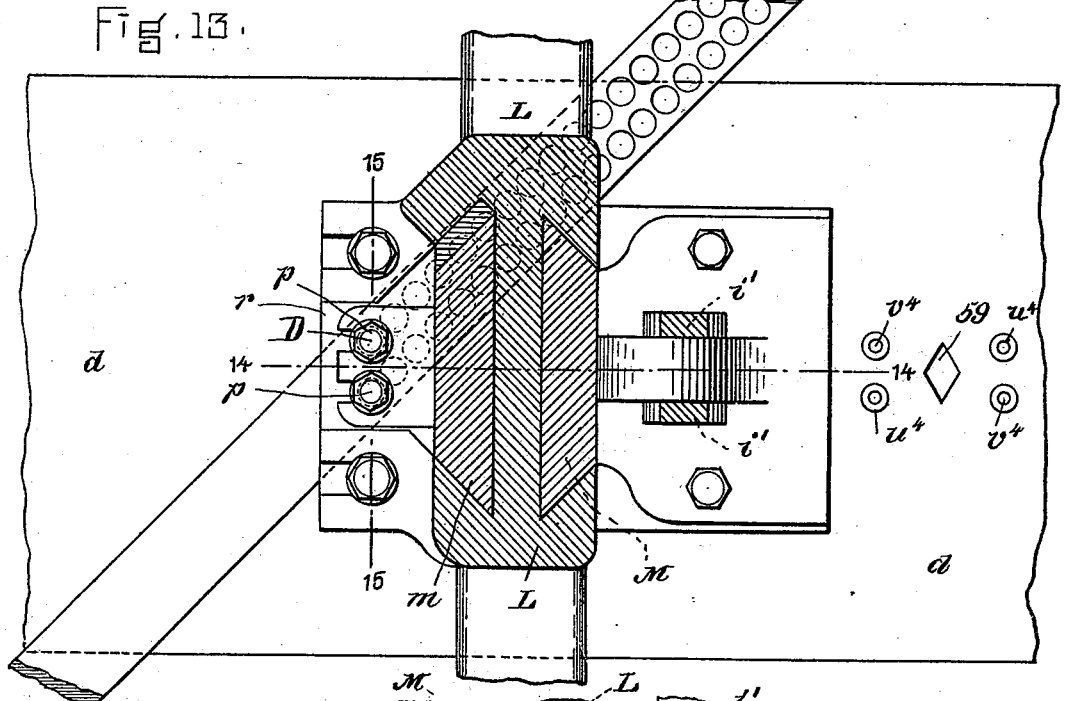
Figure 14:
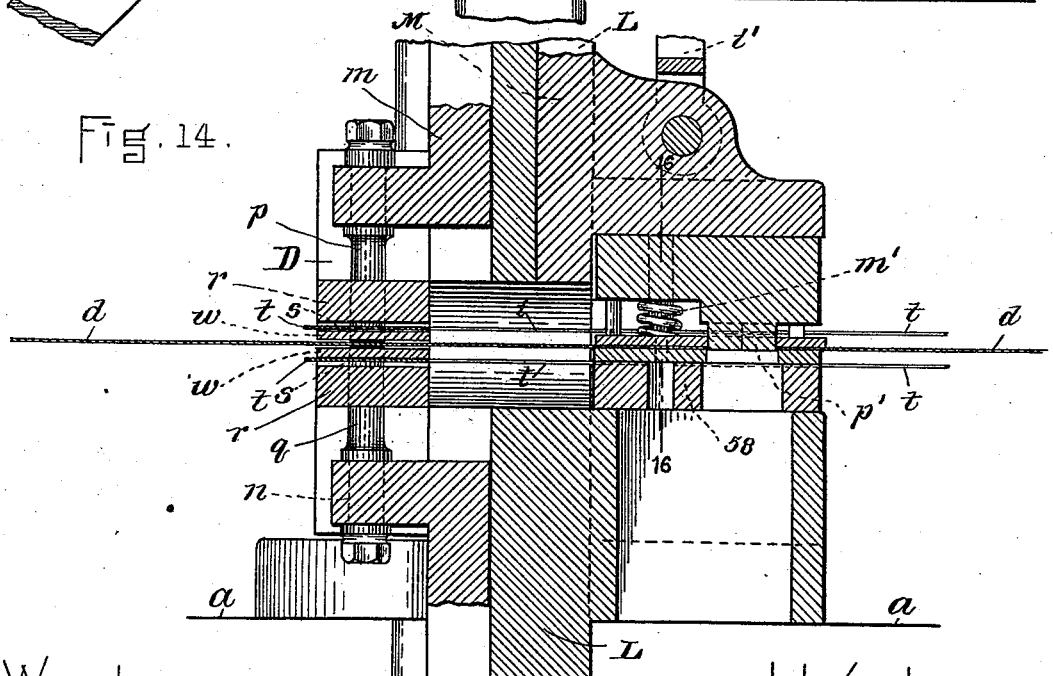
Figure 23:
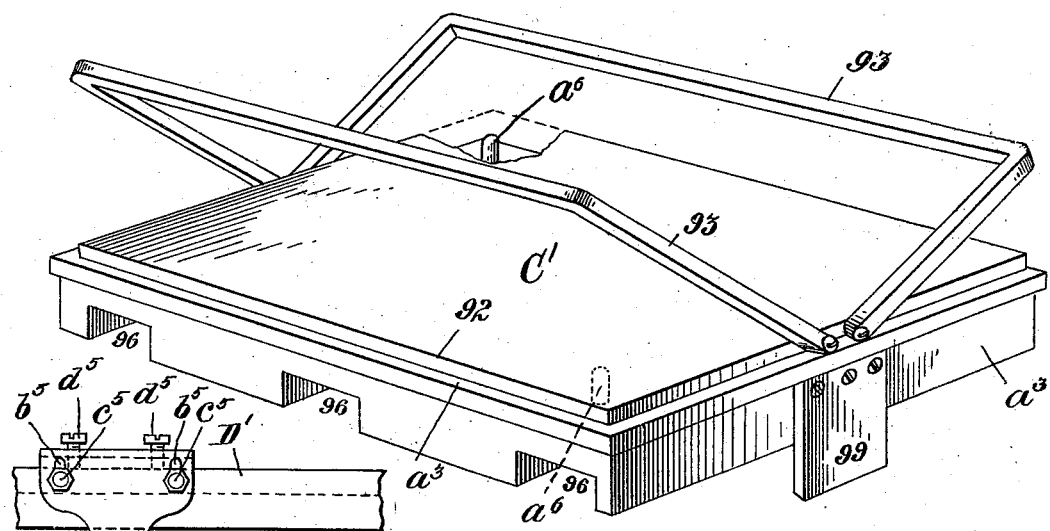

Figures 1 and 1ª are plans of my improved tag-machine. Figs. 2 and 2ª are side elevations of the same. Fig. 3 is an end elevation of the machine. Fig. 4 is a side elevation of a portion of the machine, showing the side opposite to that shown in Fig. 2. Fig. 5 is an enlarged sectional elevation on the line 5, 5, of Fig. 2, looking in the direction of the arrow. Fig. 6 is a longitudinal vertical section on the line 6, 6 of Fig. 1. Fig. 7 is a transverse vertical section on the line 7, 7, of Fig. 2. Fig. 8 is a horizontal sectional plan of a portion of the machine taken immediately above the plane of the web of paper, showing the tag-separating fingers and rocker shaft to which they are attached. Fig. 9 is a transverse section on the line 9, 9, of Fig. 2, looking in the direction of the arrow, the driving pulley not being shown. Fig. 10 is a perspective view of the auxiliary feed-rolls and rotary cutters which are located between the printing-mechanism and the web-severing mechanism, showing the manner in which the web is fed after being printed. Fig. 11 is a perspective view of the rotary cutters and their shafts. Fig. 12 is a perspective view of the main feed-rolls, their shafts and bearings. Fig. 13 is an enlarged horizontal section through the patch or washer-applying and hole-punching-mechanism. Fig. 14 is a vertical section on the line 14, 14, of Fig. 13. Fig. 15 is a transverse vertical section on the line 15, 15, of Fig. 13. Fig. 16 is a transverse vertical section on the line 16, 16, of Fig. 14. Fig. 17 is a plan-view of the strip or web of paper as it would appear in the machine from the time of the first operation thereon to the time that it is counted into separate parcels of the desired number. Fig. 18 is a view similar to that shown in Fig. 17, the tags being partly detached to form "gangs" of three. Fig. 19 is an enlarged detail of the driving gears which operate the upper feed roll-shafts of the pair adjacent to the rotary cutters. Figs. 20, 21, 22, 23, 24, and 25 are details to be referred to.

My invention has for its object to provide an organized machine for making paper shipping-tags from a continuous length or web of the tag-material, and counting out and separating the finished tags into piles or parcels of any desired number; and my invention consists in a machine embodying a washer-applying and hole-punching-mechanism, a printing-mechanism, a feed-mechanism arranged between the washer-applying and punching mechanism and the printing mechanism, and adapted to feed the web to the printing-mechanism, a cutting-mechanism for severing the tags from the web, feed rolls and rotary shears arranged longitudinally in line with each other between the printing mechanism and the web-severing mechanism, said rotary shears being adapted to divide the web longitudinally through the center before reaching the web-severing cutters, and mechanism for separating the finished tags into piles or parcels of any desired number, all arranged to operate as hereinafter fully set forth.

In the said drawings, A represents the frame of the machine comprising the bed $a$, end supports $b$, $b$, therefor, and uprights $c$ for supporting the main or driving shaft B and other working parts of the machine; said shaft B being provided with a heavy balance wheel or pulley C adapted to be driven by a belt not shown in the drawings.

The web $d$ of thick paper, cardboard, or other suitable material, the width of which is twice the length of a single tag, as shown in Figs. 17 and 18, passes from a roll, not shown, through the machine in the following order: first to the washer-applying and hole-punching mechanism D, which is located at the front end of the bed $a$, and by means of which the reinforcing patches are applied to the opposite surfaces of the tag, and the eyes or holes punched therethrough to form washers, and through the tag, and also diamond shaped holes punched through the web of tag-material to form the beveled upper corners of the finished tag; secondly, to the printing mechanism E by which the web is printed; thirdly, to the cutting mechanism G which severs the tags from the web either singly or in "gangs," the web being divided longitudinally through its center before reaching the severing-cutters by rotary shears or cutters $f, f$, to be hereinafter described, located between the printing mechanism E and web-severing mechanism G, the web passing lastly to the counting and separating mechanism H by which the tags when severed singly from the web by the cutting mechanism G, are separated into piles of any desired number.

I, J, are the main feed-rolls which are mounted on shafts $g, h$, and are located between the washer-applying and hole-punching mechanism D and the printing mechanism E, and serve to draw the web $d$ through the said mechanism D and push it forward through the printing mechanism E. This arrangement of the feed-rolls whereby the web $d$ is acted upon by said feed-rolls before it reaches the printing mechanism, I consider of great importance as it enables me if desired to cover the surface of the tag with printing without any liability of blurring or defacing the same, which could not be accomplished if the feed-rolls were placed beyond the printing mechanism; furthermore as the feed-rolls do not come into contact with the printed surface of the web, I am enabled to use rolls of considerable width and thereby secure a good frictional hold or grip upon the web and avoid any liability of slip. I am also by this construction enabled to have the feed-rolls bear upon the body of the web and not at the edges thereof, and consequently a perfectly even feed is at all times insured which cannot be accomplished when the feed-rolls bear on the extreme edges of the web, owing to the variations in the thickness of the said edges when one of them is an outside or selvage edge of a wide web from which the tag-material is cut.

The two pairs of feed-rolls I, J, are driven from the main shaft in the following manner: $i$, is a bevel-gear fast on the shaft B, and meshing with a smaller bevel-gear $k$ on a transverse shaft $l$ having its bearings in the framework and carrying at one end a crank-disk 50 having an adjustable crank-pin 51 to which is pivoted a rod 52, the lower end of which is connected with a ratchet-and-pawl mechanism K adapted to intermittingly rotate the lower feed-roll shaft $h$. The shaft $g$ of the upper feed-rolls is forced downward toward the shaft $h$ of the lower feed rolls by means of suitable springs which exert a pressure upon the vertically sliding boxes of said upper feed-roll shaft, whereby the necessary friction upon the web or strip of paper $d$ is produced to insure a positive intermittent feed; each movement of the feed-rolls carrying the web forward a distance equal to the width of a single tag. The feed-roll shafts $g, h$, are connected at one end so as to revolve together by means of gears 53, 54, Fig. 12, the lower shaft $h$ being provided with a hand-wheel 55 whereby it may be turned by hand when it is desired to enter a fresh web or strip of tag material between the feed rolls.

The washer-applying and hole-punching mechanism may be of any suitable or approved construction. That, D, here shown is of special construction, which forms the subject of a separate application for Letters Patent, Serial No. 445,555, filed by me September 10, 1892, and consequently a general description only will be here given sufficient to give a general understanding of its construction and mode of operation. This mechanism D comprises a frame L bolted to the bed $a$, and provided with vertical guideways in which are fitted two slides $m, n$, to which are secured two upper punches $p$ and two lower punches $q$, which co-operate with corresponding dies formed in blocks $r$ secured to the frame L, one immediately above and the other immediately below the web $d$ of tag-material as shown in Fig. 6. In each of these blocks $r$ is formed at an angle of about forty-five degrees to a line extending longitudinally through the machine, a narrow horizontal slot or passage $s$ through which passes a web or strip $t$ of patch-material glued on one side, said web being unwound from a roll not shown. The two strips $t$ after being passed through the slots $s$ are brought together and passed between a pair of intermittingly actuated feed-rolls $u, v$, by which the said webs are drawn through the slots $s$ where they are acted upon by the punches $p, q$, which punch out four disks or patches $u^4$, Figs. 17 and 18, which are then carried by said punches into contact with and firmly pressed against the opposite surfaces of the web $d$ of the tag-material to which they are caused to adhere by the moistened glue on the side of the patch next to the web $d$. By thus causing the webs $t$ of patch-material to pass across the web $d$ of tag-material diagonally as shown, I am enabled to punch out the patches at a minimum distance apart and very much closer together than could be effected if the webs $t$ passed across the web $d$ at a right angle, a great saving of material being thereby effected.

Each of the blocks $r$ is provided with a removable punch-clearer or "pull off" plate $w$, Figs. 6 and 14, which forms one side of the diagonal slot $s$ through which the web of patch material passes. The slide $m$ of the upper punches is connected by a rod $a'$ with the strap of an eccentric $b'$ on the shaft $l$ by means of which it is reciprocated as desired, and to the lower slide $n$ is secured a cross head $c'$ shown in Fig. 3, having pivoted to its opposite ends two pitmen $d', d'$, the upper ends of which are connected with the straps $e, e$, of two eccentrics $e', e'$, also secured to the shaft $l$ whereby the lower slide $n$ is actuated as required.

The feed rolls $u, v$, which are set diagonally as shown to receive the strips $t$ of patch-material are mounted on short shafts connected by gears, one of said shafts being operated by a ratchet-and-pawl mechanism 40 which is actuated intermittingly by a lever $f'$ fulcrumed at $g'$ and operated against the resistance of a spring 41, Fig. 4, by a cam $h'$ on the shaft $l$.

M is a vertical slide moving in a guideway formed in the frame L, on the side opposite to the slide $m$, and being connected by a rod $i'$ to a lever $k'$ fulcrumed to one of the uprights $c$ at 42, said lever $k'$ being pivoted to the upper slide $m$ whereby the two slides are actuated simultaneously by the eccentric $b'$. To this slide M are secured two punches $m'$, $m'$, shown in Fig. 16, which co-operate with corresponding dies in a block 58 shown in Figs. 8 and 16, and as the web $d$ is fed along after having had the patches $u^4$ applied thereto by the punches as described, act to punch the eyes or holes $v^4$, Figs. 17 and 18, through the patches to form the washers and also through the web $d$ itself, thus forming eyes at the upper ends of the tags. To this same slide M is also secured a diamond-shaped punch $p'$ which co-operates with a corresponding die in the block 58 and serves to punch out the diamond-shaped holes 59 at the proper intervals along the center of the web $d$, as shown in Figs. 17 and 18, in order that after the tags are cut from the web they may have the upper corners beveled as required. These punches $m'$ and $p'$ are provided as usual with suitable clearer or "pull off" plates through which they pass.

The printing mechanism E may be of any suitable or approved construction which can be connected with the driving power of the machine and caused to print upon the web as it passes from the washer-applying and hole-punching mechanism D next adjacent thereto.

The printing machine shown in the drawings is of special construction which forms the subject of a separate application for Letters Patent, Serial No. 477,950, filed by me June 17, 1893, and therefore its general construction only will be now herein described.

C' is a stationary platen which is secured to the bed $a$, by a central clamping screw $a^2$, and is made adjustable in height by means of leveling screws $b^2$ located at its corners and passing down through the bed, beneath which they are provided with hand wheels $c^2$, by which they may be turned to effect the desired adjustment of the platen.

D' represents the vertically reciprocating form-bed which co-operates with the platen C', said bed being provided on its upper side with a hollow actuating plunger $d^2$, adapted to slide in a suitable guide E' bolted to the uprights $c$ of the framework, said plunger having pivoted to it at 60 a rod $e^2$ connected to the strap of an eccentric G' on the main or driving shaft B, by means of which the desired vertical reciprocating movement is imparted to the form-bed D'.

Figure 24:
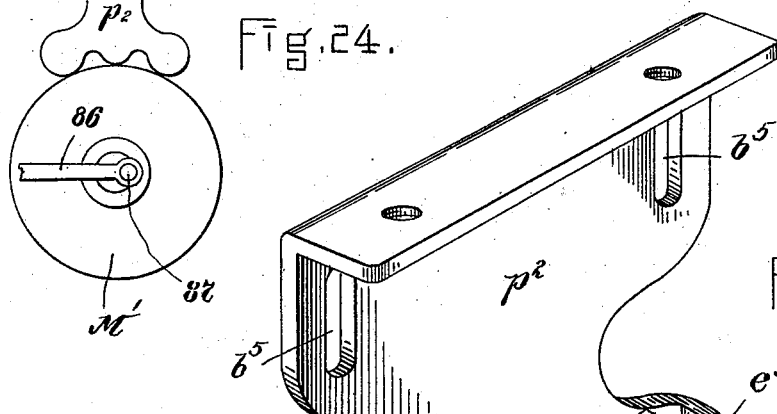
Figure 25:
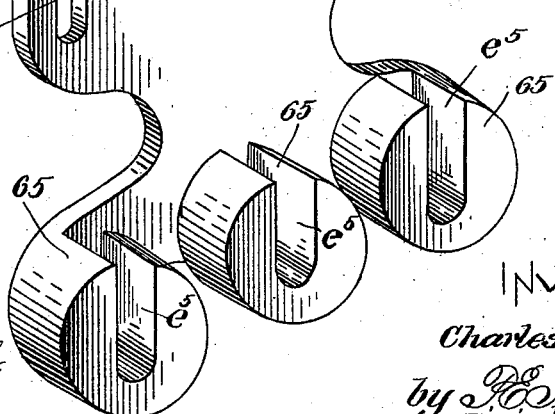

The form bed D' extends out beyond the platen at the sides as shown in Figs. 1, 3, 7, and 8, and is provided with horizontal grooves or guideways 56 in which are fitted two reciprocating type-form carriers L', L', which are arranged to slide horizontally in said ways in opposite directions away from and toward the center of the form-bed D', whereby the type-forms 61 secured to the carriers L' in any suitable manner are caused to pass over and in contact with the form-inking rollers both on their outward and inward movement or traverse. Each of the type-forms is inked by a series of form-inking rollers $w^2$, the shafts of which are supported in hangers $p^2$ adjustably secured to the sides of the form-bed D' by means of slots and bolts $b^5$, $c^5$ and adjusting screws $d^5$, as shown in Fig. 24; said hangers being provided on the inner side with bosses 65, shown in Figs. 6, 8, and 25 having vertical slots $e^5$ for the reception of the journals of the form-roller shafts, whereby as the form-bed descends to give the impression, the journals of the form-rollers rise in the said slots and the form-rollers are thus permitted to settle or adjust themselves around the curved or convex surface of the ink-cylinder M' to insure the proper supply of ink therefrom before the next outward movement of the type-forms, while on the ascent of the form-bed the form-rollers descend by their own gravity as far as permitted by said slots, which causes the tops of said rollers to be brought to a uniform level, thus insuring perfect and complete contact of the form-rollers with all parts of the type-forms as the latter pass thereover, both on their outward and inward movement.

The type-form carriers L', L', are reciprocated in their guideways 56 to bring them alternately into their printing and inking positions by means of rods $q^2$, $q^2$, pivoted thereto at 67 and having their outer ends pivoted at 68 to levers N' depending from long hubs or sleeves 69 secured to horizontal rock shafts P' which are supported in bearings in the framework and arranged on opposite sides of the machine, said hubs or sleeves 69 being each provided with an inwardly curved arm Q' carrying at its upper end an anti-friction roll 70 which rests on the surface of an actuating cam R' on the main or driving shaft B. The rolls 70 are kept constantly in contact with the cams R' by means of stiff spiral springs 71 the opposite ends of which are attached to arms 72 extending upward from the hubs 69 on the rock-shafts P', whereby as the shaft B is rotated the cams R' acting on the rolls 70 of the arms Q' lift the same against the stress of the springs 71 and through the connections described, cause the type-form carriers L' to be simultaneously moved inward to their printing positions as shown in Fig. 7, the outward movement of the carriers L' with their type-forms to enable the latter to receive their supply of ink as described, being effected by the springs 71 as the cams revolve. The arrangement of the mechanism is such that as soon as the plunger $d^2$ with the form bed D' has risen about one-eighth of an inch after producing the impression, the type-forms commence to move outward to be inked and are returned to their printing positions by the time the eccentric G' has completed its revolution, and by attaching the form-rollers to the reciprocating form-bed as described, so that they will move up and down therewith and thereby be caused to periodically come into contact with the ink-cylinders M' arranged directly beneath them in stationary bearings, I am enabled to ink the type-forms and feed the paper while the form-bed is in motion, very short movements of the reciprocating mechanism being consequently required.

The shafts of the inking cylinders M' by which the form-rollers are supplied with ink are supported in stationary bearings $t^2$ in the framework and are each provided with a grooved pulley 73 which is driven by a belt 74 from a grooved pulley 75 on a shaft 76 having its bearings in the lower portion of the framework and carrying a pulley 77 which is driven by a belt 78 from a pulley 79 on the driving shaft B as shown in Fig. 7.

The ink-cylinders M' are supplied with ink by distributer-rolls $w'$ and vibrator-rolls 80 of the usual construction, which are supplied by ductor-rolls 81 which are adapted to be periodically brought into contact with the fountain-rolls 82 in the ink-fountains 83 in the following manner: The shaft of each of the ductor-rolls 81 is supported in bearings at the outer end of a frame 84 pivoted to lugs on the ink-fountain; said frame being pressed upward to lift the ductor-roll away from the fountain-roll and bring it into contact with the vibrator-roll by a pin 85 Fig. 3 projecting up from a rocker $r'$ which is oscillated on the shaft of the fountain-roll by a connecting rod 86 pivoted at its opposite end to a crank pin 87 Figs. 8 and 24 on the end of the shaft of the ink-cylinder M', the frame 84 with the ductor-roll dropping by its own gravity to bring the ductor-roll down upon the fountain-roll as the pin 85 descends on the downward oscillation of the rocker $r'$. To this rocker $r'$ is pivoted a pawl $q'$, which engages with a ratchet-wheel 88 on the shaft of the fountain-roll which is thus rotated as the rocker $r'$ is oscillated.

The "throw-off" device by means of which the working surface of the platen is lowered or "thrown off" to prevent the taking of an impression is constructed as follows: The platen C' is composed of two principal portions or halves $a^3$, $b^3$, the upper portion or half $a^3$, having a false or removable plate 92 which forms the upper or working face of the platen and to which is secured the tympan-frame 93 by which the blanket and tympan sheet, Fig. 7, are held in place upon the platen in the usual manner. The removable top-plate 92 is steadied and held in place by steady pins $a^6$, shown in Fig. 23 projecting from the upper portion $a^3$ into the holes in the under side of the plate 92 which permit of the latter being easily removed with the tympan-frame whenever it may be found necessary to gain access to the tympan-sheet or blanket to adjust the same, thereby avoiding the necessity of removing the entire portion $a^3$ which would be inconvenient. The upper surface of the lower portion $b^3$ of the platen is provided with a series of half-round grooves 94 which form sockets or bearings for a corresponding number of rock-shafts $d^3$, each of which is provided with a longitudinal rib or projection 95, Figs. 6 and 7, which fits into a rectangular groove 96 formed in the under side of the upper portion $a^3$ of the platen, the height of these projections 95 being such that when turned up by rocking the shafts $d^3$ a quarter revolution into the position shown in Figs. 6 and 7, they will act upon the portion $a^3$ and raise it clear of the portion $b^3$ to its proper printing-level, the corners of the projections 95 being rounded off to facilitate this movement. When, however, it is desired to "throw off" the platen so as not to print as the web passes beneath the type-forms, the projections 95 are turned down flatwise, when they will lie snugly within the grooves 96, this movement causing the portion $a^3$ to descend and rest upon the surface of the portion $b^3$, in which position the working or top surface of the platen will be below its printing-level and no impression will be taken on the descent of the form-bed D'. The rock-shafts $d^3$ are each provided at one end with a slotted crank $e^3$, Fig. 6, with which engages a pin $f^3$ on a horizontal slide-bar $g^3$ moving in a groove 97 in the portion $b^3$ as shown in Fig. 6, said bar $g^3$ being actuated by a slotted lever $w^3$ projecting from a stud $i^3$, to which is secured a long lever $k^3$, provided with a handle at each end, whereby it may be operated from each side of the machine to simultaneously oscillate the rock-shafts $d^3$ and thus raise or lower the working surface of the platen as may be required, suitable guides 99 secured to the portion $a^3$ and fitting snugly against the front and rear sides of the portion $b^3$ and sliding in ways attached thereto as shown in Fig. 7, being employed to keep the portion $a^3$ in position while being raised and lowered as described.

After the web is printed the tags are severed therefrom by the cutting mechanism G, between which and the printing mechanism E is arranged a pair of narrow auxiliary feed-rolls N mounted on shafts $l^3$ supported in suitable bearings on the bed of the machine, said feed-rolls serving to keep the web $d$ drawn tightly over the platen of the printing-machine and to feed the said web forward to the web-severing mechanism G.

The shafts $m^3$, $n^3$, of the rotary shears $f$, $f$, are supported in suitable bearings and are connected so as to revolve together by gears $p^3$, $q^3$, as shown in Fig. 11, the lower shaft $n^3$ extending out beyond the bed $a$, and carrying a pulley $r^3$ driven by a belt $s^3$ from a pulley $t^3$ on the shaft 76 as shown in Figs. 4, 7, and 11. To the upper shaft $m^3$ is secured a gear 90 which meshes with an intermediate gear 91, Figs. 6 and 19, mounted on a stud projecting from a bell-crank-lever 89 which is fulcrumed on the shaft $m^3$, said gear 91 meshing with a gear 57 on the upper feed-roll-shaft $l^3$ and being kept in contact therewith by a spring $n^4$ secured to one arm of the bell-crank lever 89, as shown in Fig. 6, the motion of the cutter shaft $m^3$ being thus communicated to the upper feed-roll N which is rotated with a surface velocity greater than that of the web $d$, whereby the latter is kept tightly stretched over the tympan-sheet of the printing machine as required and pulled off the type-form after being printed. The lower feed roll N is merely rotated by the friction of the web $d$ of paper as the latter passes in contact therewith.

The feed rolls N bear upon the web $d$ at the center of its width where there is no printing, thus avoiding the blurring or defacing of the same.

The rotary shears which divide the web longitudinally into two equal parts have a peripheral velocity greater than the movement of the web, thereby assisting the feed-rolls N in carrying the paper forward to the tag-severing mechanism. These rotary shears would in themselves feed the web by their draft thereon were it not for the diamond-shaped holes 59, Figs. 17 and 18, previously punched therein, which would prevent the rotary cutters from drawing forward the paper as soon as they reached one of the said diamond-shaped holes. For this reason I employ the narrow auxiliary feed-rolls N in connection with the rotary shears and arrange said feed-rolls and shears at such distance apart that when the shears are in one of the diamond-shaped holes as seen in Fig. 10, the feed-rolls will be acting upon the solid portion of the web midway between two consecutive diamond-shaped holes, while when the feed-rolls cease to draw or feed the paper by reason of being in one of the said holes, the rotary shears will be acting with full force upon the web at a point midway between two of said holes, whereby the web is kept constantly stretched and fed forward as required.

Cutting mechanism of any suitable or approved construction may be employed for severing the printed tags from the web, said mechanism being driven from the main shaft B. The web-cutting mechanism here shown is adapted to sever the tags from the web either singly or in sheets containing a series or "gang" of tags partly severed from each other. The said web-severing mechanism G is of special construction which forms the subject of a separate application for Letters Patent, Serial No. 479,633, filed by me July 5, 1893, and will now be generally described.

$H^2$, $H^2$, are two adjustable bed-cutters formed in a single piece extending transversely across the machine, as shown in Figs. 5 and 6, each having a straight horizontal edge, and $I^2$, $I^2$, are two swinging cutters arranged above the cutters $H^2$ and adapted to co-operate therewith, said cutters $I^2$, $I^2$, being adjustably secured to cutter levers $K^2$, $K^2$, pivoted at $l^4$, between two vertical pieces or plates $J^2$, $J^3$, rising from and forming part of a carriage $L^2$, to which are also adjustably secured the two bed cutters $H^2$, $H^2$, said carriage $L^2$ being adapted to slide horizontally on dovetail ways on the bed of the machine and having secured to it a rod 25 which is provided at its outer end with a screw-thread and is moved in the direction of its length to vary the position of the carriage by means of a small bevel-gear 26 threaded to fit the rod 25 which passes therethrough, said gear 26 meshing with a bevel-gear 27 on a shaft 28 provided with a crank-handle 29 by which means the carriage $L^2$ may be moved forward and back on its ways to vary the distance between the feed-rolls N and the cutters $H^2$, $H^2$, in order that the latter may make a cut exactly on the division line between two contiguous tags, a nice adjustment being necessary to produce accurate work where a change is made in the width of the tag or a new web is inserted between the feed-rolls N. After the carriage has been adjusted it is clamped immovably in place by means of a clamping screw $a^4$, provided with a hand wheel $a^5$.

To the driving shaft B is secured a heavy cam W, which acts upon an anti-friction roll 30 mounted in a lever $N^2$, pivoted at 31 to the upper end of a post $m^4$ secured to and rising from the side-plates $J^2$, $J^3$, of the carriage $L^2$, said lever being drawn upward to keep the roll 30 constantly in contact with the cam W by means of a spiral spring $m^2$, one end of which is secured to the lever at 32 while the opposite end is hooked over the upper end of a post $p^4$, secured to and rising from the plates $J^2$, $J^3$, opposite to the post $m^4$. The width of the cam W is such that the roll 30 of the lever $N^2$ will remain in full contact therewith as the carriage $L^2$ is adjusted on its way toward and from the feed-rolls N and rotary shears $f$.

To the lever $N^2$ are pivoted at 33, 33, two connecting rods $g^4$, $g^4$, the lower ends of which are pivoted at 34, 34, to the two cutter-levers $K^2$, $K^2$, whereby as the shaft B is rotated, the cam W acting on the roll 30 of the lever $N^2$, depresses the latter against the stress of the spring $m^2$, and through the connections described, causes the cutters $I^2$, $I^2$, to be swung downward to cut the web as required, the upward movement of the cutters being effected by the spring $m^2$, which draws up the lever $N^2$ as the cam revolves, a single revolution of said cam producing in connection with the spring $m^2$, two downward and two upward movements of the cutters $I^2$, $I^2$. The lower edge of each cutter $I^2$, $I^2$, is beveled longitudinally in opposite directions to produce a shearing cut and also to cause the lowermost point or angle of its cutting edge to first enter the web and cut gradually in opposite directions as it descends, this construction enabling the cutter to be adjusted to cut the strip either partially or wholly across its width according as it is forced down more or less.

The cutter levers K², K², are each pivoted to the side pieces J², J³, of the carriage L² by means of two screws s⁴, s⁴, provided with check-nuts, whereby the said levers can be adjusted laterally to compensate for the wear of the upper or lower cutters which can thus be readily kept in proper lateral adjustment with relation to each other. To prevent lateral movement or spring of the free ends of the cutter levers K², K², away from the stationary bed cutters H², I provide a backing plate $t^4$, shown in Figs. 5 and 6, which is secured to the plate J³ of the carriage L² by means of screws provided with check-nuts, said plate being pressed up against the sides of the free ends of the levers K², K², which move in contact therewith as they are swung up and down by the connecting rods $g^4$, $g^4$. The plate $t^4$ is adjusted for wear and kept closely in contact at all times with the levers K², K² by means of suitable adjusting-screws.

Immediately above the bed-cutters H² is secured a guide plate $w^4$, Figs. 5 and 6, the front edge of which is curved upward to facilitate the entrance of the web $d$ which passes through the throat that is formed between the plate $w^4$ and the bed-cutters H², said plate serving as a clearer to prevent the upper cutters I², I², as they rise from lifting the web $d$ up from the bed-cutters H².

I will now describe the manner in which the movable cutters I², I², are automatically held out of action or prevented from cutting entirely through the web until after it has been fed forward a predetermined number of times, whereby pieces or sheets of the web $d$, each of sufficient length to form a series or "gang" of tags of the required number, as shown in Fig. 18, are caused to be cut off without care or attention on the part of the operator. Each of the connecting rods $g^4$, $g^4$, is constructed to yield in the direction of its length against the resistance of a spring and is composed of a tubular portion or sleeve 44, which is pivoted to the cutter lever K² at 34 and a plunger 36 pivoted at its upper end to the lever N² at 33 and adapted to slide within the tubular portion 44 as shown in Fig. 5, where it rests upon a spiral spring 38 of sufficient rigidity to transmit the pressure of the plunger 36 to the tubular portion 44 and thence to the cutter lever K² and cutter I² to cause the latter to cut the web on the descent of the lever N², the vertical movement of the plunger 36 within the tubular portion 44 being limited by a pin 39 and slot 45. The tubular portion 44 is provided on one side with a lug or projection s' through which passes vertically an adjusting screw t', the lower end of which is adapted to strike against the end u' of a horizontal slide v', which thus forms a stop for arresting the descent of the portion 44 and cutter lever K² connected therewith, thereby preventing the cutter I² from passing through the web to sever the same on the division line between two consecutive tags. As soon as the screw t' strikes the stop u', the plunger 36 of the rod or connection $g^4$ slides within the portion 44, compressing the spring 38 which thus takes up the remainder of the downward movement of the lever N² as the latter is actuated by the cam W. By adjusting the screws t' to cause them to project more or less below the lugs s', the positions of the cutters I², I², when their downward movement is interrupted, may be varied if desired to cause them to partially cut through the web $d$ on the division line between two consecutive tags, so that they will be prevented from coming into contact at all with the web until after the withdrawal of the stop u'.

As before stated the web $d$ is fed forward a distance equal to the width of a single tag at each intermittent movement of the main feed-rolls I, J, which movement is followed by the descent of the cutters I², I², and after a piece of the web $d$ containing the desired number of tags has been fed forward, the slides v', (one for each cutter,) are each moved horizontally by a disk or wheel Q provided with projections n' against the resistance of a light spring 46, Fig. 5, to bring an aperture 24 in said slide immediately beneath the end of the screw t', thus pushing out of the way or withdrawing the stop u' and permitting the portion 44 of the connecting rod $g^4$ to be forced down by the lever N² to the full extent of its movement which causes the cutter connected therewith to pass entirely through the web, thus cutting off therefrom a series or "gang" of connected tags, after which the slide v' is released as the disk Q revolves, when the slide is moved by the spring 46 to again bring the stop u' beneath the screw t', which causes the action of the cutters to be again interrupted until another portion of the web $d$ of the desired length has been fed forward, when the operation is repeated.

Figure 22:
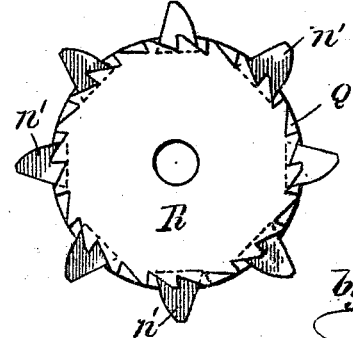
Figure 21:
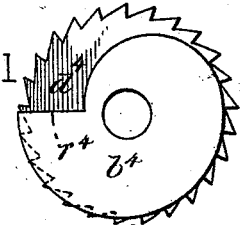

The construction of the stop-operating disk Q may be somewhat varied as it may be provided with notches or divisions or otherwise constructed to periodically withdraw or move a stop out of the way of the screw t' to allow the cutters to sever the web as above described. Each disk Q has secured to it a ratchet-wheel R, as shown in Fig. 22, both being supported by and free to revolve on a horizontal stud or pin secured to the plate J³ of the carriage L², said ratchet-wheels being each actuated by a pawl 47 pivoted to the end of a lever 48 fulcrumed on a post 49 rising from the plate J³. These levers 48 are both pivoted to a link 23 which fits within the enlarged bifurcated end of a rod l', the upper end of which is pivoted to the end of the lever N² at 66, whereby as the lever N² is moved up and down by the cam W and spring $m^2$, sufficient motion will be communicated to the levers 48 to cause the pawls 47 to move the ratchet-wheels R one notch at each upward movement of the lever $N^2$, the difference between the amount of motion of the lever $N^2$ and that required for the levers 48 being compensated for by a slot in the rod $l'$ which takes up the lost motion. On the descent of the lever $N^2$ the link 23 and with it the levers 48 are drawn down by a spring 62 shown in Fig. 6, an adjustable stop 63, serving to limit the downward movement of the said levers 48.

Each of the disks Q is provided with eight projections $n'$, while the ratchet-wheel R secured thereto has twenty-four teeth, consequently each of the stops $u'$ is withdrawn or moved out of the way of the screw $t'$ thereover as soon as the main feed-rolls I, J, have fed forward a length of the web $d$ containing three tags as seen in Fig. 18, and it will be obvious that by varying the relative proportion between the number of projections or divisions of the disk Q and the number of teeth of the ratchet-wheel, making one the multiple of the other, a "gang" or series of any desired number of tags can be cut from the web, and if it should be desired to cut the tags one by one or singly from the web, it is merely necessary to adjust the screws $t'$ so that they will not come into contact with the stops $u'$, when the cutters will descend and sever a single tag from the web, after each forward movement of the main feed-rolls I, J. When the tags are severed one by one or singly from the web $d$, they are counted and separated into piles or parcels of any desired number by a counting and separating mechanism which may be of any suitable or approved construction.

The counting and separating mechanism H, shown in the drawings is of the special construction which forms the subject of a separate application for Letters Patent, Serial No. 475,775, filed by me May 27, 1893, and will now be generally described. S is a table, over and in contact with which passes an endless traveling belt or carrier T, which is stretched over two rollers U, V, the latter placed immediately beneath the web-severing mechanism in order that the belt T may be in a position to receive the tags as they fall from the web-severing mechanism G, said tags dropping onto the belt in such manner as to lie partly over each other as shown in Fig. 17, with their longest dimension in the direction of the width of the belt. The belt T also passes over a roll 98 and is kept tight by means of a tightening-roll 99 shown in Fig. 2$^a$. The shaft of the roller U by which the belt T is driven, is provided with a sprocket-wheel which is in turn driven by a chain $e^{10}$ passing over a sprocket-wheel on a shaft $f^2$, which is provided with a worm-wheel $g^2$, which is engaged by a worm $k^2$ on the horizontal shaft 76 which extends beneath the table S. $h^3$ is a horizontal rock-shaft having its bearings in one of the uprights of the framework and extending transversely across the belt T a short distance above the same, said shaft being provided with a series of lugs or collars $i^2$, made adjustable on said shaft in the direction of its length, and held in place by setscrews $h^3$. Within an aperture $l^3$ in the lower portion of each of the lugs or collars $i^2$, is loosely pivoted by means of a pin $r^2$ shown in Fig. 20, or in any other preferred manner, a finger $s^2$, the opposite end of which consists of a small plate or scraper-blade $u^2$, of the form shown in Fig. 9, said blade being arranged substantially at right angles with the belt T so that when permitted to drop upon the line of tags passing thereunder, it will catch the edge of the first one which is brought up to it by the movement of the belt in the direction of the arrow $v^2$, Fig. 2. From a lug $u^3$ secured to the rock-shaft $h^3$ at or near its center projects an arm $v^3$ which rests against the surface of the cam-wheel $b^4$, supported by and free to revolve on a stud or pin $c^4$ mounted on a bracket projecting from the framework, said cam-wheel having secured to it a ratchet-wheel $d^4$, which is actuated by a pawl $e^4$ pivoted to the lower end of a vertically reciprocating slide-bar $f^4$, moving in guides $h^4$ and actuated in one direction by a cam $i^4$ on the driving shaft B, and in the opposite direction by a spring $k^4$, whereby the cam-wheel $b^4$ is intermittingly rotated, and as soon as the point $r^4$, (shown in Fig. 21) of the cam wheel $b^4$ is carried past the end of the arm $v^3$, the latter is released, thus permitting the fingers $s^2$ to drop by their own gravity onto the two lines or rows of tags upon the belt T, when the lower edges of the scraper-blades $u^2$ of said fingers will intercept the edges of the next tags brought into contact therewith, thus holding back the two advancing lines of tags being carried forward, and producing a separation between the same and those in front of the fingers which are being carried forward by the belt T. As soon as a sufficient separation has been effected, say two or three inches, the cam-wheel $b^4$ commences to depress the arm $v^3$, rocking the shaft $h^3$ and raising the fingers $s^2$ clear of the tags, which then advance with the belt until the fingers are again dropped which takes place when a predetermined number of tags, (in this case twenty-five in each row or line) have passed beneath the fingers which on their descent intercept the twenty-sixth tag, holding back the line as before, and in this manner the tags are scraped together by the fingers and separated on the upper surface of the belt into piles or parcels of the required number, which as they are carried along by said belt, are removed by the attendant and packed away or otherwise disposed of, the necessity of counting them out by hand being thus avoided and a considerable saving in time and labor thereby effected. By pivoting the fingers $s^2$ loosely to the rock-shaft $h^3$ so that they can rise and fall independently thereof, they are enabled to accommodate themselves to the inequalities of the surface of the belt T to insure catching the edges of the tags at the exact time required at different portions of the width of the belt, which would not always be the case if they were rigidly attached to the shaft $h^3$, and consequently the liability of failure of any one of the fingers to catch a tag at the proper time, which would result in a miscount, is entirely avoided.

When short tags are being fed onto the carrier-belt T, a single separating finger $s^2$ for each row or line of tags will answer well, but where the tags are of considerable length, I prefer to employ two fingers for each line or row of tags, as shown in Fig. 9, in order to keep them squarely and evenly in place upon the belt as they are scraped into piles, and I regard two fingers, each having a narrow scraping blade as preferable to a single finger with a wider scraping blade for the reason that two separate fingers loosely connected to the rock-shaft will accommodate themselves better to the inequalities of the surface of the belt.

The adjustment of the collars $i^2$ on the shaft $h^3$ in the direction of its length enables the fingers $s^2$ to be arranged at proper distances apart to adapt them for tags of different widths and cause them to be scraped together in piles or parcels squarely and evenly as required.

By the employment of a cam-wheel $b^4$ having more than one projection, or by varying the number of teeth on the ratchet-wheel $d^4$, the descent of the fingers $s^2$ may be timed for separating the tags into parcels of any desired number.

As before stated, the washer-applying and hole-punching mechanism, the printing mechanism, the web-severing mechanism, and the tag-counting-and-separating mechanism form the subjects of separate applications filed by me on the respective dates before mentioned. Whatever therefore is shown, described, and claimed in the aforesaid applications I do not desire to claim in the present case.

What I claim as my invention, and desire to secure by Letters Patent, is—

1. In a machine for manufacturing tags and analogous articles from a continuous web, the combination of a washer-applying and hole-punching mechanism, a printing mechanism next adjacent thereto, intermittingly actuated feed-rolls arranged between the said washer-applying and hole-punching mechanism and the printing mechanism and behind the latter, a cutting mechanism for severing the tags from the web either singly or in " gangs " said cutting mechanism being arranged next in succession to the printing mechanism, narrow auxiliary feed-rolls arranged to bear upon the web of tag-material along the center of its width, and rotary shears or cutters adapted to divide the web longitudinally beyond the said feed-rolls, said rotary cutters and feed-rolls being arranged in line with each other between the printing mechanism and the tag severing mechanism, substantially as set forth.

2. In a machine for manufacturing tags and analogous articles from a continuous web, the combination of a washer-applying and hole-punching mechanism, a printing mechanism, next adjacent thereto, intermittingly actuated feed-rolls arranged between the said washer-applying and hole-punching mechanism and the printing mechanism, and behind the latter, a cutting mechanism for severing the tags from the web either singly or in "gangs," said cutting mechanism arranged next in succession to the printing mechanism, narrow auxiliary feed-rolls arranged to bear upon the web of tag-material along the center of its width, said web being of a width equal to twice the length of a single tag and having holes punched at intervals along the center of its width, and rotary shears or cutters adapted to divide the web longitudinally beyond said feed rolls, said rotary cutters and feed-rolls being arranged in line with each other between the printing mechanism and the tag-severing mechanism, and placed at such distance from each other that the rotary shears will feed the web when the feed-rolls are in one of its central holes and vice-versa, substantially as described.

3. In a machine for manufacturing tags and analogous articles from a continuous web, the combination of a washer-applying and hole-punching mechanism, a printing mechanism next adjacent thereto, intermittingly actuated feed-rolls arranged between said washer-applying and hole-punching mechanism and the printing mechanism, and behind the latter, a cutting mechanism for severing the tags from the web, said cutting mechanism arranged next in succession to the printing mechanism, narrow auxiliary feed-rolls arranged to bear upon the web of tag-material along the center of its width, said web being of a width equal to twice the length of a single tag, and having holes punched at intervals along the center of its width, rotary shears or cutters adapted to divide the web longitudinally beyond the said feed-rolls, said rotary shears and feed-rolls being arranged in line with each other between the printing mechanism and the tag-severing mechanism, and placed at such distance from each other that the rotary shears will exert a forward draft upon the web when the feed-rolls are in one of its central holes, and vice versa, and mechanism for separating the finished tags into piles or parcels of any desired number, said separating mechanism being arranged next in succession to the mechanism for severing the tags from the web, all combined and arranged to operate substantially as set forth.

4. In a machine for manufacturing tags and analogous articles from a continuous web, the combination, with the printing mechanism and the mechanism for severing the tags from the web, of the rotary cutters $f, f$, having their shafts $m^3$, $n^3$, connected by gears, the shaft $m^3$ being provided with a gear 90, the feed-rolls N arranged in line with said rotary shears, and the shaft of the upper feed-roll being provided with a gear 57 meshing with an intermediate gear 91 mounted on the bell-crank-lever 89, said gear 91 meshing with the gear 90 on the shaft $m^3$, whereby the motion of the rotary cutters is communicated to the upper feed-roll N, all operating substantially as described.

Witness my hand this 1st day of August, A. D. 1893.

CHARLES E. SAWYER.

In presence of—
P. E. TESCHEMACHER,
R. HENRY MARSH.